March 3, 1959 J. T. WISSMANN 2,876,294

MAGNETIC RECORD CONTROL METHOD AND CIRCUITS

Filed Oct. 19, 1953 3 Sheets-Sheet 1

INVENTOR.
JOSEPH T. WISSMANN
BY Sol R. Goshaw
ATTORNEY.

MAGNETIC RECORD CONTROL METHOD AND CIRCUITS

Filed Oct. 19, 1953 3 Sheets-Sheet 2

INVENTOR.
JOSEPH T. WISSMANN
BY [signature]
ATTORNEY.

March 3, 1959 J. T. WISSMANN 2,876,294

MAGNETIC RECORD CONTROL METHOD AND CIRCUITS

Filed Oct. 19, 1953 3 Sheets-Sheet 3

INVENTOR.
JOSEPH T. WISSMANN
BY [signature]
ATTORNEY.

United States Patent Office
2,876,294
Patented Mar. 3, 1959

2,876,294

MAGNETIC RECORD CONTROL METHOD AND CIRCUITS

Joseph T. Wissmann, Burbank, Calif., assignor to Warner Bros. Pictures, Inc., Burbank, Calif., a corporation of Delaware Application October 19, 1953, Serial No. 387,003

10 Claims. (Cl. 179—100.2)

This invention relates to magnetic recording and reproducing systems, and particularly to a magnetic record system for adjusting the volume characteristic of magnetic records.

In sound recording and reproducing systems of the photographic type, compression and expansion are well-known. In such systems, compression and expansion have been obtained by varying the photographic characteristics of the record and by electronic control of the gain of an amplifier at different signal levels. The present invention is one wherein the compression or expansion is introduced into a record of the magnetic type, which has already been recorded or one which is being recorded.

The invention also includes a circuit for automatically adding high frequency compensation during either the compression or expansion operation. A separate control track may also be used to control the amount of compression and expansion.

The principal object of the invention, therefore, is to facilitate the recording and reproducing of magnetic sound records.

Another object of the invention is to provide an improved magnetic record compression and expansion method and system.

A further object of the invention is to provide an improved magnetic record compression and expansion system in which high frequency compensation is added automatically and one using a separate control record.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figure 1:
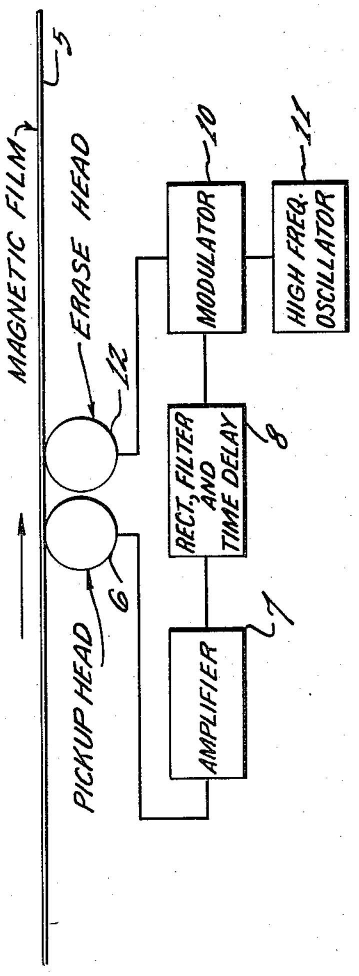
Fig. 1 is a diagrammatic view of a compression or expansion system for a magnetic record already recorded.

Referring now to the drawings, and particularly to Fig. 1, a magnetic film 5 is shown having a motion in the direction of the arrow. This magnetic film has a record recorded thereon, which record is detected by a pickup or reproduce head 6. The output from the pickup head 6 is fed to an amplifier 7 and then to a combination rectifier, filter, and time delay unit 8. The output of unit 8 is impressed on a modulator 10 which is connected to a high frequency oscillator 11, the modulator having its output connected to an erase head 12 in contact with the magnetic medium 5. The erase head 12 is placed as closely as physically possible to the pickup head 6, and a time delay is then introduced so that the erase head acts on the record at substantially the point of detection by the head 6.

Figure 5:
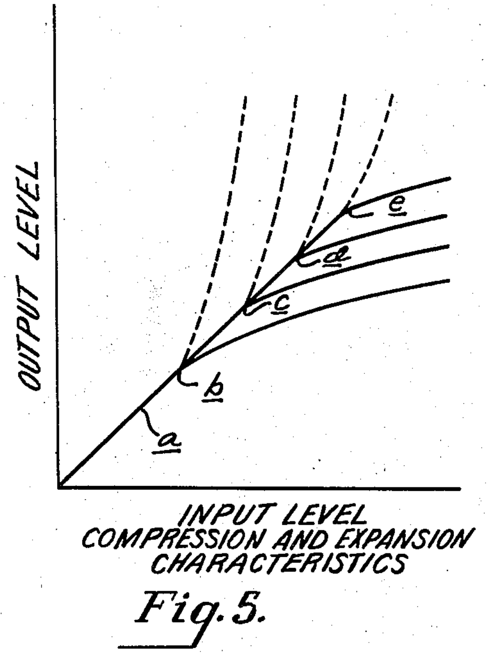
Fig. 5 is a graph showing the relationship between the input and output levels when compression and expansion are introduced.

It is well-known that compression is obtained by reducing the output level of a signal non-linearly with respect to its input level. That is, as shown in Fig. 5, the curve *a* indicates that the output level is directly and linearly proportional to the input level up to the various points *b*, *c*, *d*, and *e*, after which the solid curves indicate that the output level is compressed with respect to the input level. The dotted curves indicate expansion of the signal, all curves having the same respective break-away points *b*, *c*, *d*, and *e* for purposes of explanation, although it is to be understood that the break-away points for expansion may be different from those for compression.

Thus, in Fig. 1, the system operates by amplifying the signal on the record 5, obtaining therefrom a direct current which follows substantially the envelope of the original signal with the audible components removed by the filter, and then delaying this rectified signal sufficiently to permit the erasing current to be impressed on the erase head 12 at the time the detected signal point reaches the erase head.

The output of the unit 8 is impressed on the modulator 10 which is adjusted so that all high frequency current is completely blocked from oscillator 11 to the erase head 12 until the direct current envelope voltage rises above a preset value. For instance, this linear relationship will exist up to point *b*, if this is the break-away point desired. When this point is reached, the erase current will then flow to the erase head, and the level of the magnetic sound record is reduced. Thus, for example, if the input is doubled beyond point *b*, the output may only increase about one and one-half times.

By adjusting the modulator tube characteristic, the reduction ratio may be varied to give any desired compression slope, as shown by the curvature of the solid lines in Fig. 5. If expansion is desired, the operation of the modulator 10 is reversed. That is, the direct current envelope voltage will now block off the high frequency erasing current from oscillator 11 above a certain predetermined signal level. Below this value, the high frequency erasing current is allowed to pass to erase head 12 at such an inverse proportion as to give the desired expansion slope to the signal on the magnetic sound track 5, resulting in the effect shown by the curvatures of the dotted lines in Fig. 5. Actually, the expansion characteristic would have the linear portion at the high levels and the curved sections over the lower levels.

Figure 2:
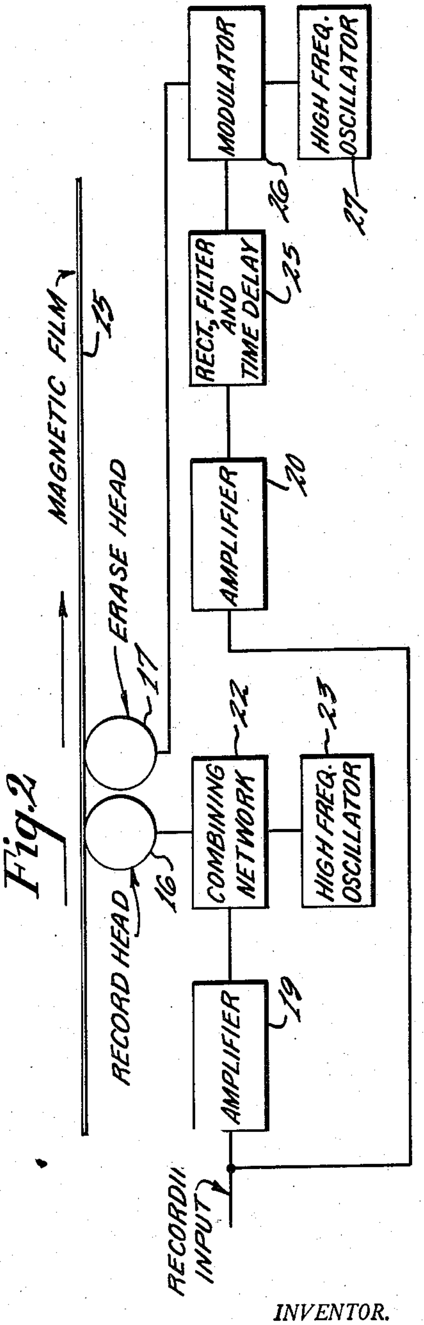
Fig. 2 is a diagrammatic view of a compression and expansion system which functions during the recording of the record.

Referring now to Fig. 2, this circuit produces a compressed or expanded magnetic sound record as the record is being recorded. In this system, a magnetic film 15 is passed over record head 16 and then over erase head 17, these heads being placed together as closely as physically possible longitudinally of the film. A signal to be recorded is impressed on the amplifier 19 from any suitable source, such as a microphone or a phonograph, the signal also being impressed on a second amplifier 20. The output of recording amplifier 19 is impressed on a combining network 22, which is connected to a high frequency bias oscillator 23 in the normal manner. The combined high frequency and audible signal are then impressed on recording head 16.

The output of amplifier 20 is impressed on the rectifier, filter, and time delay unit 25, and then on a modulator 26 connected to a high frequency oscillator 27, the output of the modulator being impressed on erase head 17. Thus, the units 20, 25, 26, 27, and 17 are the same as units 7, 8, 10, 11, and 12 in Fig. 1, and they operate in an identical manner. Compression and expansion are thus produced in the record being recorded, as described above in connection with Fig. 1.

Figure 3:
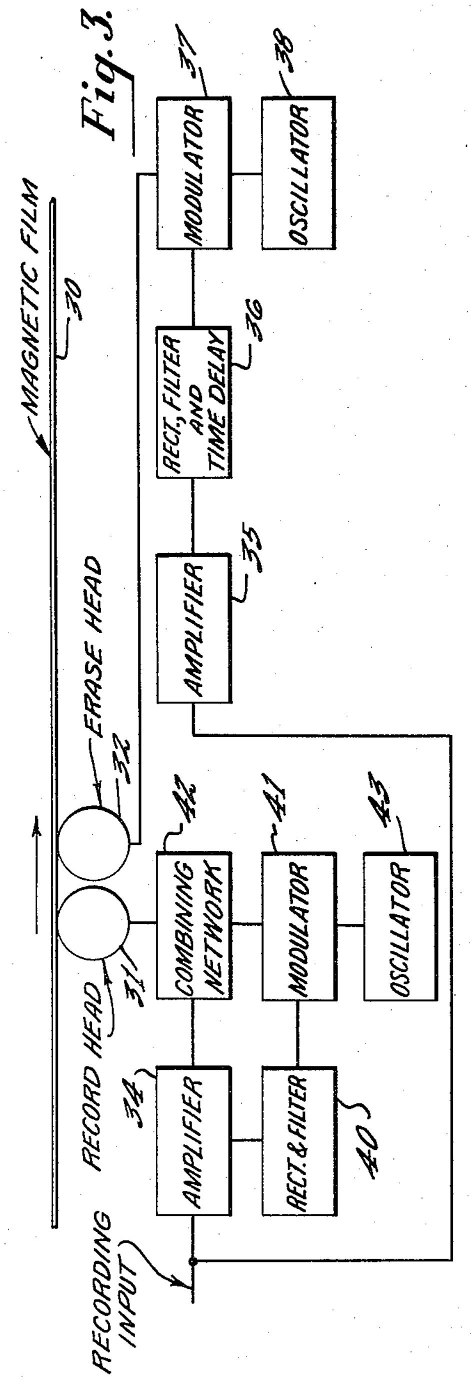
Fig. 3 is a diagrammatic view of a system for providing automatic high frequency compensation.

Referring now to Fig. 3, a circuit for automatically adding high frequency compensation to the system shown in Fig. 2 is illustrated. In Fig. 3, a magnetic film 30 is passed over a record head 31 and an erase head 32 in the direction shown by the arrow. Again, the signal to be recorded with head 31 is impressed on the amplifier 34, while another portion of the signal is impressed on the amplifier 35 connected to a rectifier, filter, and time delay unit 36, which, in turn, is connected to a modulator 37, which is connected to a high frequency oscillator 38, the output of the modulator 37 feeding the erase head 32. The units 35, 36, 37, 38, and 32 are the same and function identically with units 20, 25, 26, 27, and 17 in Fig. 2, and units 7, 8, 10, 11, and 12 in Fig. 1. However, the recording unit now includes a second rectifier and filter 40 and a modulator 41 in addition to the combining network 42 and oscillator 43 of the system shown in Fig. 2.

Figure 6:
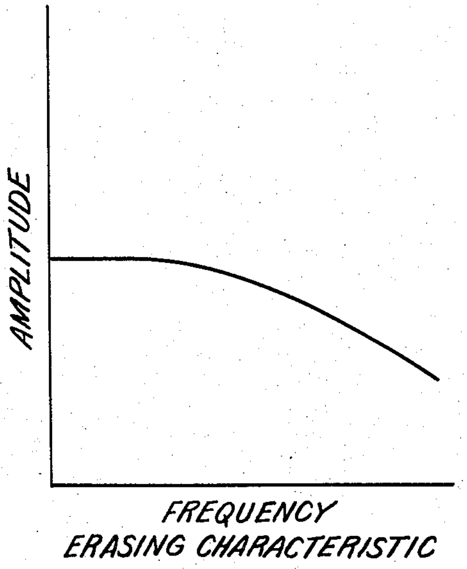
Fig. 6 is a graph showing the relationship between amplitude and frequency introduced by the erasing operation.

Referring to Fig. 6, the efficiency of the erasing energy on signals of different frequencies is shown. This graph indicates that the erasing energy is more effective in erasing the higher frequencies than it is in erasing the lower frequencies. This is not only true at the erase head, but it is also true at the record head on which the high frequency bias current is impressed, and it is more pronounced as the high frequency current is increased in level. The system of Fig. 3 compensates for this discrimination.

In Fig. 3, signal energy from amplifier 34 is rectified and filtered to provide a direct current envelope, which, in turn, controls the output of the recording bias oscillator 43 through modulator 41. The modulator 41 is adjusted so that the recording bias is reduced as the signal direct current envelope voltage increases above a certain value in the case of compression or as a direct current envelope voltage decreases below a certain value in the case of expansion. This point corresponds to the break-away points of the prior systems, such as shown in Fig. 5. The system functions by adjusting the normal high frequency bias to a value somewhat greater than optimum to cause an attenuation of the high frequency portion of the signal being recorded. The amplifier 34 is given a rising frequency characteristic to aid in compensating for the high frequency recording loss. Also, if the level of the bias current is reduced, it is evident that the signal will be recorded with a rising high frequency characteristic. In the operation of the circuit, therefore, when the signal reaches such a value as to cause the erase head to operate, it also causes the high frequency bias from oscillator 43 to be reduced. In this way, the disproportionate loss in the high frequency region of the signal due to partial erasing is compensated for automatically by the increase in high frequencies resulting from the reduction in recording bias.

Figure 7:
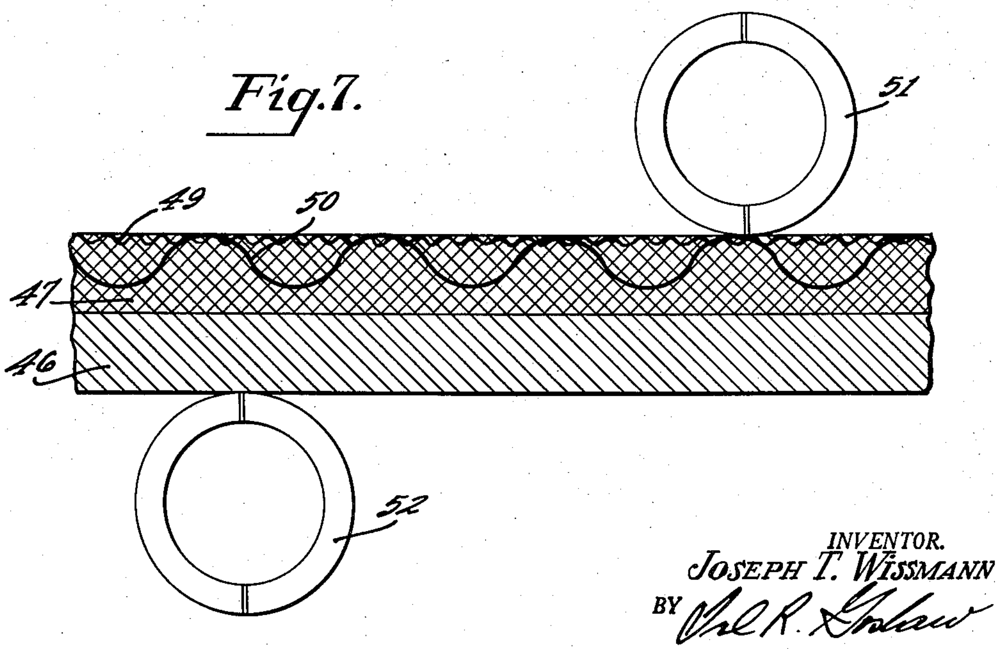
Fig. 7 is an enlarged section of a magnetic record medium illustrating the erasing effect on low and high frequency signals.

To illustrate why the high frequencies are reduced more than the low frequencies for a certain level of erase current, a section of a magnetic medium is shown in Fig. 7 as having a base 46 and a magnetic coating 47. Signals of two different frequencies are shown in the medium, a high frequency wave being illustrated at 49 and a low frequency wave being illustrated at 50. The drawing indicates that the high frequency wave is close to the surface, while the low frequency wave penetrates to a greater depth in the magnetic coating. Now, with the magnetic head in contact with the coating, as shown at 51, which is the usual procedure, it is obvious that the high frequency magnetic variations in the coating will be subjected to a stronger erasing field than the low frequency variations, which may not be completely reached by a certain value of erasing current otherwise very effective on wave 49. To obtain an improved erasing characteristic, the erasing head, such as shown at 52, may be placed in contact with the uncoated side of the base 46. In this manner, a more uniform relationship is obtainable between frequency and amplitude during erasing than that shown in Fig. 6, and the automatic frequency compensator, as shown in Fig. 3, may not be necessary, depending upon the type of magnetic medium being used.

Figure 4:
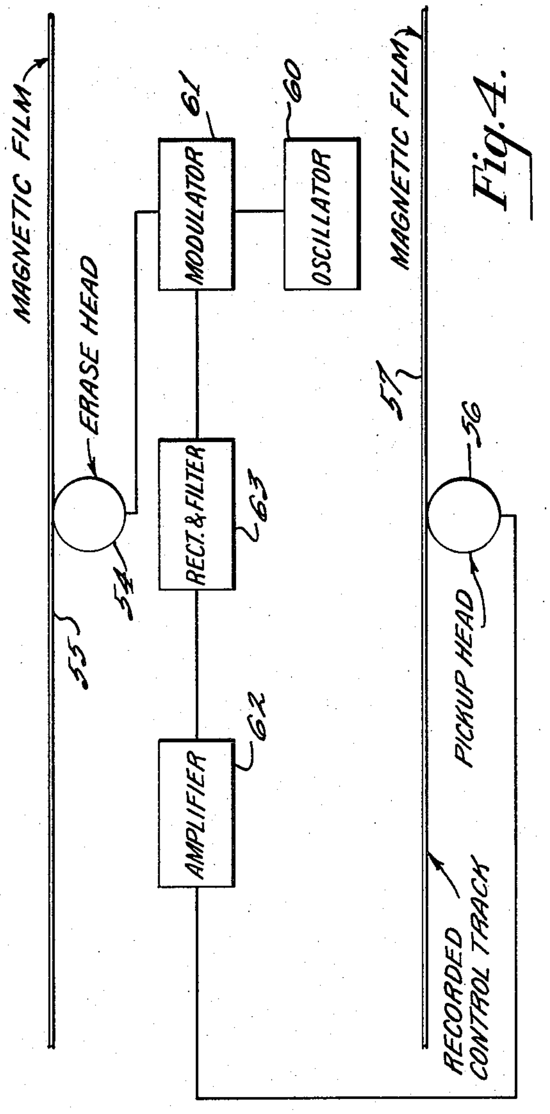
Fig. 4 is a diagrammatic view of a compression and expansion system in which a control track is employed.

Referring now to Fig. 4, an erase head 54 is shown in contact with the magnetic film 55, while a pickup head 56 is shown in contact with a magnetic film 57. The film 55 has the signal to be compressed or expanded thereon, while the film 57 has a control track thereon. The film 57 may be magnetic or a photographic sound record could be used. The system operates in the same manner as the prior systems, except that the source of the signal for controlling the amount of erase current in the erase head 54 is obtained from oscillator 60 through modulator 61 after amplification in amplifier 62 and rectification and filtering in unit 63. It will be noted that no time delay unit is required in this system, since the control track film may have its pickup head located at the same longitudinal position as the erase head 54 on the signal film.

I claim:

1. A system for non-linearly varying the average level of a signal on a magnetic medium comprising means for electrically detecting a signal on said medium, means for variably erasing with an electrical current the signal on said medium, means for varying said erasing current applied to said last mentioned means in accordance with a non-linear characteristic of the volume level of the signal on said medium, and means for applying said erasing electrical current at substantially the point of said medium where said signal was detected.

2. A system in accordance with claim 1, in which said first mentioned means is a reproduce head, said third mentioned means includes an erase head, a rectifier and filter unit, a high frequency oscillator, a modulator connected to said unit, oscillator, and said head and adjusted to have a non-linear output under control of the output of said rectifier and filter unit, and said last mentioned means includes a time delay unit between said filter unit and said modulator.

3. A system for varying the average level of a signal in a magnetic medium as said signal is being recorded thereon comprising a recording head, a high frequency oscillator, a source of signals to be recorded, a combining network for impressing the output of said high frequency oscillator and said audio signal on said recording head, and means under control of the variations in level of said audio signal for variably erasing said signal in a predetermined non-linear ratio.

4. A system in accordance with claim 3, in which said last mentioned means involves an erase head, a rectifier, filter, and time delay unit, a high frequency oscillator, and a modulator connected to said unit, said oscillator and said head, and adjusted to have a non-linear output controlled by the output of said rectifier, filter, and time delay unit.

5. A system for recording a magnetic record on a magnetic medium in a level relationship different from the original level relationship of the signal comprising a source of audio signals, a record head, a high frequency oscillator, a combining network for mixing the output of said high frequency oscillator and said audio signal, a modulator interconnected between said high frequency oscillator and said combining network, and a rectifier and filter unit interconnected between said modulator and signal source for varying the output of said oscillator as impressed on said combining network in accordance with the erasing frequency characteristic of said audio signal.

6. A system in accordance with claim 5, in which means are provided for partially erasing the record recorded on said film in accordance with a predetermined non-linear amplitude characteristic of said audio signal.

7. A system in accordance with claim 6, in which said last mentioned means involves an erase head, a rectifier and filter unit, a high frequency oscillator, and a modulator connected to said unit, said oscillator, and said head and adjusted to have a non-linear output controlled by the output of said rectifier and filter unit which varies in accordance with the level of said signal.

8. A system for varying the average level of a signal in a magnetic medium having a magnetic record thereon, comprising a magnetic head adapted to contact said medium, a high frequency energy generator, a modulator connected to said generator and to said head, and means for controlling the amount of high frequency energy from said generator impressed on said head, said high frequency energy varying the average level of the record of said signal in said medium non-linearly to produce a compressed record of said signal.

9. The method of producing a magnetic record having a level when reproduced which varies in a different relationship from the level of the original signal, comprising generating electric currents corresponding to the frequency and amplitude of a magnetic record, generating electrical currents from said signal currents varying in accordance with the variations in level of said signal currents, generating a high frequency current, varying the amplitude of said high frequency current with the currents varying with the level of said signal currents, said amplitude variation of said high frequency current being non-linear with respect to the currents varying with the level of said signal currents, and variably erasing said magnetic record of said signal with said varied high frequency current.

10. The method in accordance with claim 9, in which said non-linear varying of said high frequency current begins at a predetermined level of said signal currents.

References Cited in the file of this patent

UNITED STATES PATENTS

| | | |
|---|---|---|
| 2,610,257 | Wissmann | Sept. 9, 1952 |
| 2,704,790 | Gratian | Mar. 22, 1955 |

FOREIGN PATENTS

| | | |
|---|---|---|
| 685,227 | Great Britain | Dec. 31, 1952 |